United States Patent
Mann et al.

(10) Patent No.: US 10,538,996 B2
(45) Date of Patent: Jan. 21, 2020

(54) MULTI-GAUGE WRAP WIRE FOR SUBTERRANEAN SAND SCREEN

(71) Applicant: Baker Hughes, a GE company, LLC, Houston, TX (US)

(72) Inventors: Chance E. Mann, Katy, TX (US); Bennett M. Richard, Kingwood, TX (US); Michael H. Johnson, Katy, TX (US); Steve Rosenblatt, Phoenix, AZ (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/011,058

(22) Filed: Jun. 18, 2018

(65) Prior Publication Data

US 2018/0298734 A1 Oct. 18, 2018

Related U.S. Application Data

(62) Division of application No. 14/699,634, filed on Apr. 29, 2015, now Pat. No. 10,000,993.

(51) Int. Cl.
*E21B 43/08* (2006.01)
*B01D 29/44* (2006.01)
*B01D 29/03* (2006.01)

(52) U.S. Cl.
CPC ............ *E21B 43/088* (2013.01); *B01D 29/03* (2013.01); *B01D 29/445* (2013.01); *B01D 2201/184* (2013.01)

(58) Field of Classification Search
CPC ...... E21B 43/088; E21B 43/08; E21B 43/086; B01D 29/03; B01D 29/445; B01D 29/44; B01D 29/46; B01D 29/48; B01D 2201/184
See application file for complete search history.

(56) References Cited

U.S. PATENT DOCUMENTS

| | | | |
|---|---|---|---|
| 1,339,898 A * | 5/1920 | Layne | ................... E21B 43/088 166/232 |
| 3,709,293 A | 1/1973 | Layne et al. | |
| 6,125,932 A | 10/2000 | Hamid et al. | |
| 6,742,586 B2 | 6/2004 | Lauritzen et al. | |
| 7,188,687 B2 | 3/2007 | Rudd et al. | |
| 7,273,106 B2 | 9/2007 | Huckabee et al. | |
| 8,267,169 B2 | 9/2012 | Moen et al. | |
| 8,291,971 B2 | 10/2012 | Lopez et al. | |

(Continued)

FOREIGN PATENT DOCUMENTS

DE   20 2013 101853 U1   5/2013
WO   20100143060 A1   12/2010

*Primary Examiner* — Wei Wang
(74) *Attorney, Agent, or Firm* — Shawn Hunter

(57) ABSTRACT

A wire cross-sectional shape for a wire wrap screen provides a primary and secondary gap with a contained circumferential volume in between. The secondary gap extends screen life by taking the place of the primary gap if erosion opens the primary gap and lets the larger solids get past. The closed space between the primary and secondary gaps also has the effect of reducing velocity due to the enlarged volume before the secondary gap is reached while also creating turbulence between the gaps to slow the fluid velocity to protect the secondary gap. All or parts of the wire outer surface can optionally be coated to extend service life.

10 Claims, 2 Drawing Sheets

(56) References Cited

U.S. PATENT DOCUMENTS

| | | |
|---|---|---|
| 8,701,757 B2 | 4/2014 | Greci |
| 2005/0082060 A1 | 4/2005 | Ward et al. |
| 2009/0133874 A1 | 5/2009 | Dale et al. |
| 2009/0283271 A1 | 11/2009 | Langeslag |
| 2010/0224359 A1 | 9/2010 | Kim et al. |
| 2010/0258300 A1 | 10/2010 | Shoemate |
| 2013/0062269 A1 | 3/2013 | Hagen |
| 2013/0092391 A1 | 4/2013 | Greene et al. |
| 2014/0158295 A1 | 6/2014 | Badrak |

\* cited by examiner

MULTI-GAUGE WRAP WIRE FOR SUBTERRANEAN SAND SCREEN

FIELD OF THE INVENTION

The field of the invention is wire wrap screens for subterranean use and more particularly where the wire section presents dual gaps with a velocity containment feature in between.

BACKGROUND OF THE INVENTION

Screens are employed in completions to retain solids produced with the desired hydrocarbons. There are many styles for such screens but a popular design is commonly known as a wire wrap screen. The design of such a screen involves using a perforated base pipe and securing axially oriented mounting rods to the exterior of the base pipe. The wire is then helically wrapped over the mounting rods and secured to them at each intersection. The spacing between adjacent windings determines the particle size that is allowed to get through the screen. Sometimes punched openings are provided in outer jackets that cover over the wire wrap to protect the screen during running in.

Many optimizations of the performance of such screens have been attempted in the past. Some of these have focused on the cross-sectional shape of the wire with an eye toward keeping the manufacturing process reliable while attempting to control the flow direction for the stated purposes of enhancing throughput or reliability of operation. One issue that affects such screens is the potential for erosion from high velocity fluids that entrain produced solids. Some designs take a triangular cross-section for the wrapped wire and overlay exterior filtering layers for protection as in U.S. Pat. No. 8,701,757. Another design illustrated in US 20100258300 uses a round section for the wrap wire and varying spacing between the windings along the length of the screen. WO 2010143060 shows triangular or near trapezoidal shapes for wire cross-section with the near trapezoidal formed from taking a triangular shape and trimming one of the angles back to an arc shape. Also of interest regarding the above-mentioned wire cross-sectional shapes are the following references: US 2013/0092391 (note paragraph 36 noting that the wire shape can control flux in the screen); US 2010/0224359 (triangular with a rounded corner or trapezoidal); U.S. Pat. No. 7,188,687 (keystone shaped cross-section); U.S. Pat. No. 8,267,169 (FIGS. 3 and 4 showing triangular with rounded outer face or diamond or arrowhead shapes for the wire section); U.S. Pat. No. 8,291,971 (triangular); US 2014/0158295 (triangular with outer surface coating in FIG. 14B); U.S. Pat. No. 8,267,169 (triangular with rounded outer surface in FIG. 8); US 2005/0082060 (triangular in FIG. 7) and U.S. Pat. No. 7,273,106 (triangular in FIG. 11).

What is common to all these designs is that regardless of the shape employed for the wire cross-section, there is but a single gap between windings such that when erosion enlarges this gap the larger particles will get through and the base pipe underneath will also be exposed to erosive effects of high velocity fluids with entrained solids. The present invention seeks to improve the existing designs by offering the spacing that defines the size of the particles screened out in duplicate so that the sizing capability for excluded solids remains if one of the spacings is enlarged by erosive effects. Furthermore the backup spacing is further protected from erosive effects of high velocity fluids by virtue of the enclosed circumferential space between the outer and inner gaps because the enlarged volume between the inner and outer gaps reduces fluid velocity by the turbulence that is created to further protect the inner gap of the wire wrap and add longevity to the screen in subterranean environments. The enlarged volume area can be geometrically designed to move the erosion from the primary or secondary gap to an inner sacrificial area that does not compromise sand control. These and other aspects of the present invention will be more readily understood by those skilled in the art from a review of the detailed description and the associated drawings while recognizing that the full scope of the invention is to be determined by the appended claims.

SUMMARY OF THE INVENTION

A wire cross-sectional shape for a wire wrap screen provides a primary and secondary gap with a contained circumferential volume in between. The secondary gap extends screen life by taking the place of the primary gap if erosion opens the primary gap and lets the larger solids get past. The closed space between the primary and secondary gaps also has the effect of reducing velocity due to the enlarged volume before the secondary gap is reached while also creating turbulence between the gaps to slow the fluid velocity to protect the secondary gap. All or parts of the wire outer surface can optionally be coated to extend service life.

DETAILED DESCRIPTION OF THE PREFERRED EMBODIMENT

Figure 1:
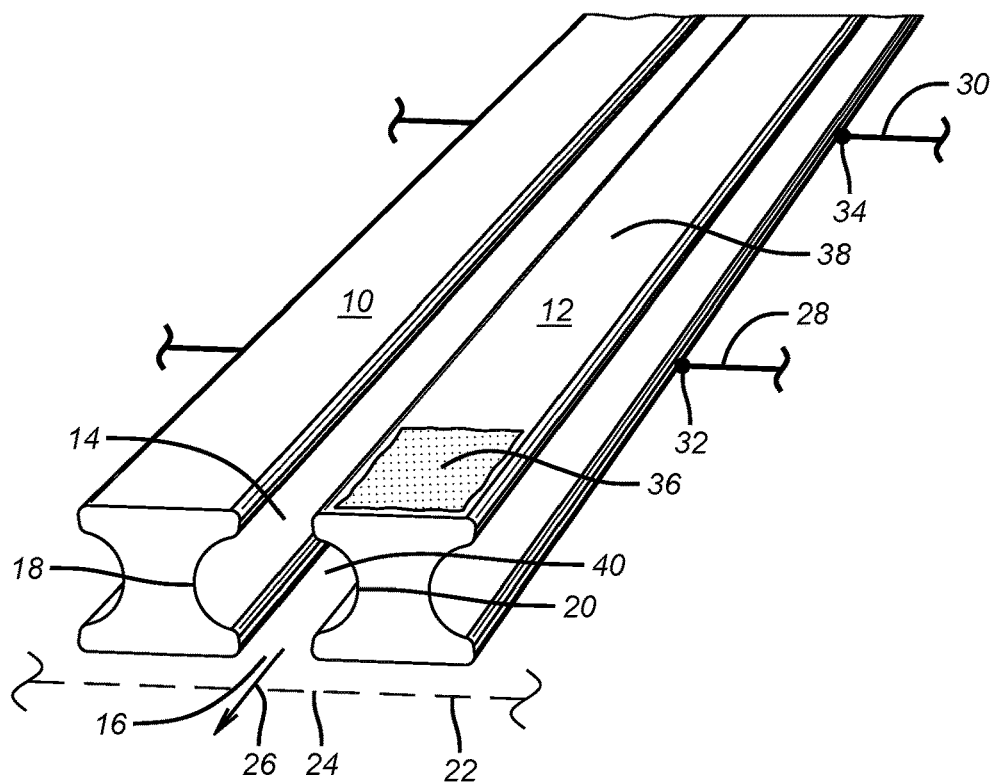
FIG. 1 is a perspective view of adjacent windings of wire wrap screen showing the general I-beam cross-sectional shape.

FIG. 1 shows in perspective two windings as they would be positioned on a wire wrap screen that is not shown. The windings 10 and 12 define a primary gap 14 and a spaced secondary gap 16. In between, there are facing arcuate surfaces 18 and 20. Flow through the screen progresses from gap 14 to gap 16 and through openings 24 in base pipe 22. The flow in production mode is in the direction of arrow 26. The cross-sectional shape is akin to an I-beam with a circular web. However, a straight web to make the cross-section more akin to a structural I-beam shape is also contemplated. A few support rods 28 and 30 that run axially on the base pipe 22 and are secured with tack welds 32 and 34 are illustrated for reference while those skilled in the art will recognize that additional rod can be used to create the needed structural strength for the assembly. Equipment to continuously wind the windings such as 10 and 12 is also known which also applies the weld or other attachment method to the rods 28 and 30 as the windings make contact in a continuous process. Preferably the gaps 14 and 16 are identical but they can also be different with 14 being larger 16 or 16 being larger than 14. Along the screen length the preferred pitch is constant although gaps 14 or 16 that change along the length of the screen are also contemplated.

A coating 36 can be applied to an outer face 38 and if desired the coating can be wrapped around into the rounded circumferential or annular space defined between curved surfaces 18 and 20 for each of the windings that make up the screen or for less than all of the windings, if desired. The coating has the objective of protecting the windings 12 and 14 from the effects of high fluid velocity. Also along those lines the winding material can be made from a hard metal or a composite or a shape memory alloy. The gaps 14 and 16 can change as between the time of manufacturing and when placed in service if for example a shape memory alloy is used. The gaps can be manufactured at a larger dimension that can close up as the transition temperature is reached if the windings are from a shape memory alloy.

Those skilled in the art will readily appreciate the differences from known designs. The wire shape creates a primary and a secondary gap so that screening can continue even if there is wear of parts of the primary gap without allowing larger particulates to get through as the secondary gap is still in service to stop such particles. The erosive effects of high fluid velocity are attenuated in two ways. First, the enlargement of the flow area after passing through gap 14 and before reaching gap 16 tends to slow the fluid velocity as does the turbulence that is created due to the change and the enlargement of the flow area between the gaps. Additionally, the enlarged space between the gaps can collect solids that would not have passed through gap 14 but for it wearing during service. Of course if there is a surrounding gravel pack in the annular space around the windings 10 and 12 solids can also accumulate there by design. The provision of multiple gaps provides for a longer service life for excluding solids down to the desired dimension. The enlarged gap creates turbulence and a velocity slowdown from the shape of the space and the fact that the flow area dimension rises either gradually or in a stepwise manner. While straight or arcuate surfaces 18 and 20 have been described, those surfaces can also be smooth or roughened to act more as a velocity deterrent.

Figure 2:
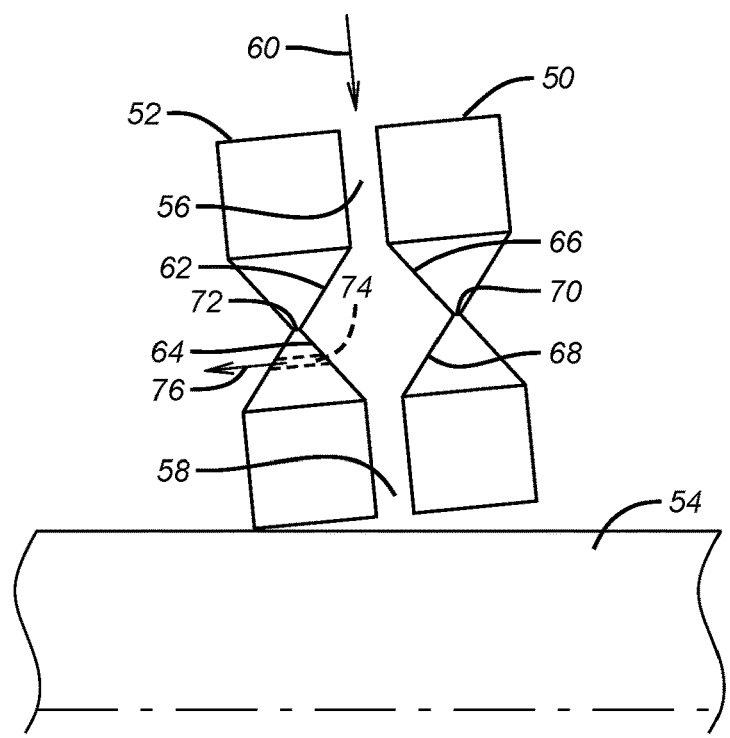
FIG. 2 is a section view of another embodiment where the section has the appearance of mirror image homes with sloped roofs and adjacent peaks.

Referring to FIG. 2 windings 50 and 52 are illustrated on base pipe 54 with the axially oriented support rods omitted for greater clarity. Here again are primary and secondary gaps 56 and 58 with the production flow in the direction of arrow 60. Surfaces 62 and 64 form a V-shape facing another V-shape made of surfaces 66 and 68. These surfaces can be rounded as they extend from a middle region 70 or 72. While regions 70 or 72 look like a narrow ridge, the width of such a ridge can be adjusted for addressing structural integrity issues. Optionally, pass through openings 74 can be provided at the ridges 70 or 72 or offset from those locations to address issues of structural integrity. Cross flow between windings 50 and 52 after gap 56 is contemplated and would occur in the direction of arrow 76. The cross flow ports such as 74 create further turbulence and reduce the erosion effects on gap 58. Such openings can also reduce the pressure drop across the screen for a given flow rate as compared with the same design without such openings. Beyond, this the recited variations described with regard to FIG. 1 are also intended to apply to the design shown in FIG. 2. Although spiral windings are contemplated independent adjacent rings of wire are also contemplated.

Figure 3:
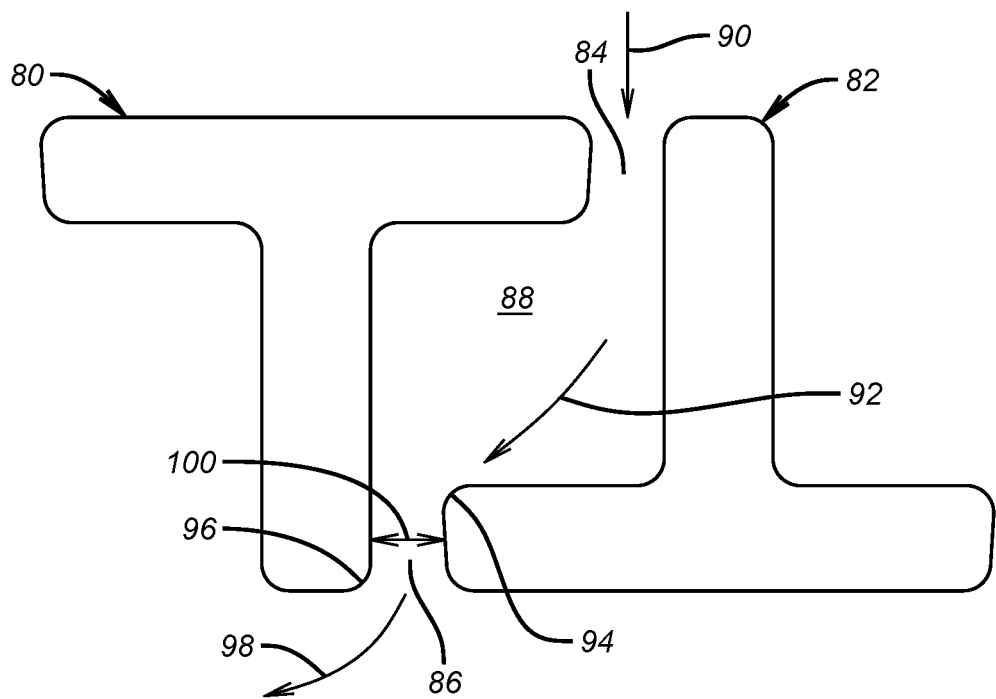
FIG. 3 is a section view of another embodiment where the section is of dual T-shaped wire where one wire is an inverted T shape and the adjacent is a right side up T-shape.

Referring to FIG. 3 two adjacent windings 80 and 82 that together define an outer gap 84 and an inner gap 86. The wires are preferably the same T-shape with one being upside down and the other being right side up. Together they define an enlarged flow space 88 that is wider than gaps 84 or 86. Gaps 84 and 86 can be the same size or one can be larger than the other in either order. Arrow 90 represents the direction of incoming fluid flow. Arrow 92 represents the continuation of that flow toward gap 86. On the way through gap 86 what erosion effects there will be will occur at corners 94 on wire 82 and corners 96 on wire 80. However, despite erosion at corners 94 and 96 there will still be an original dimension represented by arrow 100 that is the same as the gap 86 initially. Thus as the corners 94 and 96 are sacrificed the original gap 86 dimension is maintained. This extends the longevity of the wire wrap screen that is built according to the FIG. 3 embodiment. Other options as discussed with regard to FIGS. 1 and 2 are equally applicable to the FIGS. 3 and 4 embodiments.

Figure 4:
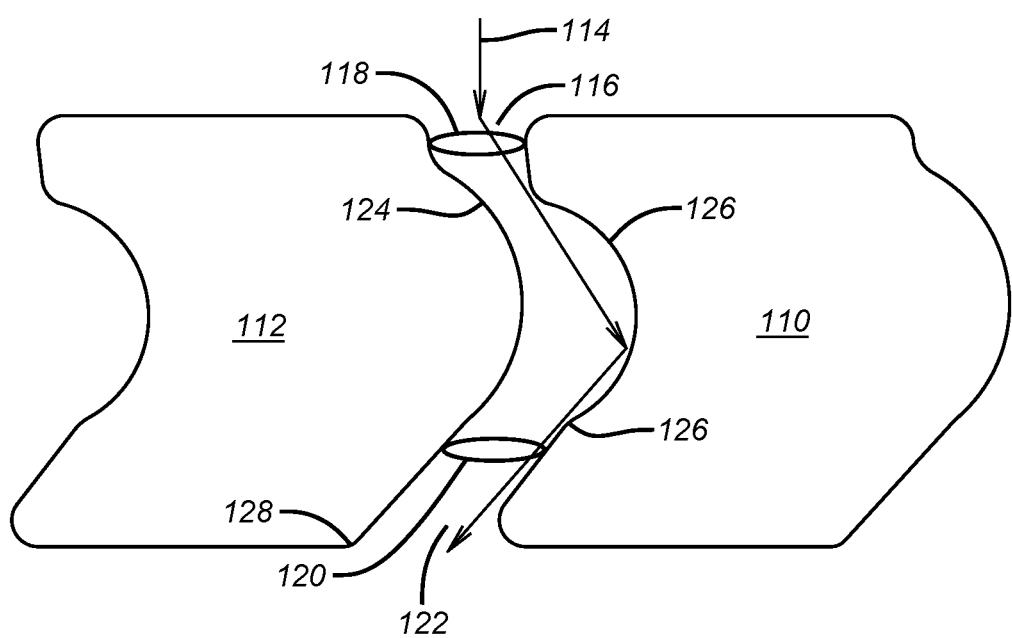
FIG. 4 is another alternative design where the passage between inner and outer face gaps makes several turns.

FIG. 4 shows two adjacent wraps of a single wire design where the wraps are 110 and 112. Arrow 114 represents flow into the outer face gap 116. Circle 118 is intended to schematically illustrate the size of the gap 116 and to show that it has some depth in the direction of flow indicated by arrow 114. Similarly, circle 120 is intended to show that the inner surface gap 122 has a depth to it as well. In between gaps 116 and 122 there is a tortuous path where the flow is forced to make at two turns after entering in the direction of arrow 114. Some of the flow is turned by surface 124 while the flow pattern is reoriented by surface 126 either of which can be a continuous arc or multiple adjacent flat or curved surfaces that have the result of preferable shooting the flow through gap 122 as close as possible to the skewed orientation of the gap 122 to minimize erosion. Even if erosion removes some of the wire at locations 126 or 128 the effective dimension of the gap 122 is retained as there is a height to the gap between locations 126 and 128 that continues to remain the same despite the onset of erosion at 126 or 128.

The above description is illustrative of the preferred embodiment and many modifications may be made by those skilled in the art without departing from the invention whose scope is to be determined from the literal and equivalent scope of the claims below:

We claim:

1. A wire cross-sectional shape for a wire wrap screen wire defining a first and second filtration gap on an outer and inner faces thereof on adjacent windings on a support structure, wherein at least one flow space in defined between said filtration gaps that is wider than said gaps at said inner and outer faces;
    said flow space is defined by opposed arcuate or flat surfaces between said adjacent wire windings; and
    wherein fluid flow radially inwardly from the flow space through the second filtration gap is skewed with respect to a longitudinal axis of the support structure; and
    said flow space defined by said arcuate or flat surfaces further comprises opposing V-shapes between said adjacent wire windings.

2. The wire of claim 1, wherein:
    wherein said flow spaces define a radial flow paths between said inner and outer faces.

3. The wire of claim 1, wherein:
    said flow space defined by said flat surfaces further comprises at least one opening to permit flow between said inner and outer faces as between said adjacent wire windings.

4. The wire of claim 1, wherein:
    said gaps on said inner and outer faces are identical.

5. The wire of claim 1 wherein:
    the flow from the flow space through the second filtration gap is skewed by a surface.

6. A method of screening out produced solids from a subterranean formation, comprising:

winding a wire on a base pipe such that spaced apart filtration gaps adjacent an inner and outer surfaces of windings of said wire are connected by a flow space that is wider than said filtration gaps at said inner and outer surfaces;

configuring said filtration gap adjacent said inner surface to skew with respect to said inner surface;

orienting the flow in said flow space into alignment with said skew;

taking fluids through said gaps from a surrounding formation;

skewing the flow radially inwardly from the flow space through the second filtration gap with respect to a longitudinal axis of a support structure; and wherein said flow space defined by arcuate or flat surfaces further comprises opposing V-shapes between said adjacent wire windings.

7. The method of claim 6, comprising:
making said filtration gaps identical at said inner and outer surfaces of said wire.

8. The method of claim 6, comprising:
providing at least one opening between flow spaces of adjacent windings and between said inner and outer surfaces of said wire.

9. The method of claim 6, comprising:
continuing to exclude the same sized particles after erosion increases the size of at least a part of said filtration gap adjacent said outer surface by retaining said particle on said filtration gap on said inner surface.

10. The method of claim 6, comprising:
configuring said flow space to change the flow direction between said first and second filtration gaps to align the flow approaching said second filtration gap with an inclined orientation of said second filtration gap with respect to said inner face of said wire.

* * * * *